US012737631B2

(12) United States Patent
Pourreza et al.

(10) Patent No.: US 12,737,631 B2
(45) Date of Patent: Sep. 15, 2026

(54) TEACHING LANGUAGE MODELS TO DRAW SKETCHES

(71) Applicant: QUALCOMM Incorporated, San Diego, CA (US)

(72) Inventors: Reza Pourreza, San Diego, CA (US); Roland Memisevic, Toronto (CA); Apratim Bhattacharyya, San Diego, CA (US); Sunny Praful Kumar Panchal, Toronto (CA); Mingu Lee, San Diego, CA (US); Pulkit Madan, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 18/466,747

(22) Filed: Sep. 13, 2023

(65) Prior Publication Data

US 2024/0394936 A1 Nov. 28, 2024

Related U.S. Application Data

(60) Provisional application No. 63/469,253, filed on May 26, 2023.

(51) Int. Cl.
*G06T 11/20* (2026.01)
*G06N 3/0464* (2023.01)
(Continued)

(52) U.S. Cl.
CPC ............ *G06T 11/20* (2013.01); *G06N 3/0464* (2023.01); *G06N 3/084* (2013.01); *G06T 11/60* (2013.01)

(58) Field of Classification Search
CPC ....... G06T 11/20; G06T 11/60; G06N 3/0464; G06N 3/084
See application file for complete search history.

(56) References Cited

U.S. PATENT DOCUMENTS 10,885,344 B2 * 1/2021 Tian ........................ G06V 20/49
11,019,388 B2 * 5/2021 Choi .................. H04N 21/4312
(Continued)

FOREIGN PATENT DOCUMENTS

WO WO-2017048685 A1 * 3/2017 ............. G06T 11/10

OTHER PUBLICATIONS

Chandramouli P., et al., "LDEdit: Towards Generalized Text Guided Image Manipulation via Latent Diffusion Models", arXiv:2210.02249v1 [cs.CV], arxiv.org, Cornell University Library, 201 Olin Library Cornell University Ithaca, NY 14853, Oct. 5, 2022, 20 Pages.

(Continued)

*Primary Examiner* — Cheng Yuan Tseng
(74) *Attorney, Agent, or Firm* — Seyfarth Shaw LLP

(57) ABSTRACT

A processor-implemented method for image generation using an artificial neural network (ANN) includes receiving an input including one or more of an image or a text prompt. The ANN processes the input to determine one or more virtual brush strokes to generate an output image or one or more commands for controlling an image drawing application to generate the output image. A list of the one or more virtual brush strokes to generate the output image or the one or more commands for controlling the image drawing application to generate the output image. The one or more virtual brush strokes or commands may be executed to generate a sketch based on the input.

21 Claims, 10 Drawing Sheets

(51) Int. Cl.
*G06N 3/084* (2023.01)
*G06T 11/60* (2006.01)

(56) References Cited

U.S. PATENT DOCUMENTS

| | | | | |
|---|---|---|---|---|
| 11,482,025 | B2 * | 10/2022 | Khomenko | G06N 3/08 |
| 11,593,984 | B2 * | 2/2023 | Hussen Abdelaziz | G06N 3/08 |
| 11,880,913 | B2 * | 1/2024 | Hertzmann | G06T 11/00 |
| 11,907,637 | B2 * | 2/2024 | Ke | G06F 40/10 |
| 11,908,180 | B1 * | 2/2024 | Ho | G06N 3/045 |
| 11,941,323 | B2 * | 3/2024 | Wang | G06F 3/0482 |
| 12,073,321 | B2 * | 8/2024 | Feng | G06N 3/08 |
| 12,079,908 | B2 * | 9/2024 | Duffy | G06F 3/03545 |
| 12,094,082 | B2 * | 9/2024 | Makihira | G16H 40/67 |
| 12,154,251 | B2 * | 11/2024 | Chen | G06V 10/761 |
| 12,314,677 | B2 * | 5/2025 | Shang | G06N 3/084 |
| 2022/0207872 | A1 * | 6/2022 | Ren | G06N 3/044 |
| 2022/0392152 | A1 * | 12/2022 | Chen | G06F 3/023 |
| 2023/0205923 | A1 * | 6/2023 | Ibtehaz | G06N 3/02 726/26 |
| 2023/0222344 | A1 * | 7/2023 | Chai | G06N 3/045 706/15 |
| 2023/0377226 | A1 * | 11/2023 | Saharia | G06N 3/08 |
| 2024/0177861 | A1 * | 5/2024 | Yamane | G16H 15/00 |
| 2024/0242487 | A1 * | 7/2024 | Conde | G06V 10/764 |
| 2024/0289998 | A1 * | 8/2024 | Wang | G06V 10/774 |
| 2024/0362265 | A1 * | 10/2024 | He | G06N 3/08 |
| 2025/0173613 | A1 * | 5/2025 | Oktay | G16H 15/00 |

OTHER PUBLICATIONS

Frans K., et al., "CLIPDraw: Exploring Text-to-Drawing Synthesis through Language-Image Encoders", arXiv:2106.14843v1 [cs.CV], arxiv.org, Cornell University Library, 201 Olin Library Cornell University Ithaca, NY 14853, Jun. 28, 2021, 9 Pages.

Guo C., et al., "ArtVerse: A Paradigm for Parallel Human—Machine Collaborative Painting Creation in Metaverses", IEEE Transactions on Systems, Man, and Cybernetics: Systems, IEEE, Piscataway, NJ, USA, vol. 53, No. 4, Apr. 1, 2023, pp. 2200-2208.

Huang F., et al., "Sketchforme: Composing Sketched Scenes from Text Descriptions for Interactive Applications", User Interface Software and Technology (UIST'19), New Orleans, LA, USA, Oct. 20, 2019-Oct. 23, 2019, pp. 209-220.

International Search Report and Written Opinion—PCT/US2024/022051—ISA/EPO—Jul. 5, 2024.

Arnone S., "Sketch-RNN: A Generative Model for Vector Drawings", Magneta, 2021, pp. 1-4.

Huang F., et al., "Sketchforme: Composing Sketched Scenes from Text Descriptions for Interactive Applications", arXiv:1904.04399v1, (cs.HC) Apr. 8, 2019, pp. 1-11.

* cited by examiner

750

| Task 752 | Scenario 754 | Default prompt 756 |
|---|---|---|
| GENERATE-ALL | SINGLE W/O LOCATION | Draw a sketch of <class-article><class-name> |
| | SINGLE W/ LOCATION | Draw <class-article><class-name><location-tag> this sketch |
| | MULTI W/ REL | Draw a sketch of <relationship-tag> |
| | MULTI W/O REL | Draw a sketch of <objects-list> |
| GENERATE-PARTIAL | SINGLE | Complete this sketch as <class-article><class-name> |
| | MULTI W/ LOCATION | Add <class-article><class-name><location-tag> this sketch |
| | MULTI W/O LOCATION | Add <class-article><class-name> to this sketch |
| REMOVE-ALL | SINGLE | Remove <class-article><class-name> from this sketch |
| | MULTI | Remove all the objects from this sketch |
| REMOVE-PARTIAL | MULTI W/ LOCATION | Remove <class-article><class-name><location-tag> this sketch |
| | MULTI W/O LOCATION | Remove <class-article><class-name> from this sketch |
| REPRODUCE | ALL | Reproduce this sketch |
| CLASSIFICATION | SINGLE | What is the class of this sketch |
| | MULTI W/ LOCATION | What is the object <location-tag> this sketch |
| | MULTI W/O LOCATION | What are the objects in this sketch |

* <location-tag> ∈ {at the top of, at the bottom of, at the center of, at the right side of, at the left side of, at the top right corner of, at the top left corner of, at the bottom right corner of, at the bottom left corner of}.
* <class-article> ∈ {a, an, the} depending on <class-name>.
* <relationship-tag> includes subject, object, and the relationship between them.
* <objects-list> refers to the objects in the sketch with their counts.

*FIG. 7B*

TEACHING LANGUAGE MODELS TO DRAW SKETCHES

CROSS-REFERENCE TO RELATED APPLICATION

The present application claims the benefit of U.S. Provisional Patent Application No. 63/469,253, filed on May 26, 2023, and entitled "TEACHING LANGUAGE MODELS TO DRAW SKETCHES," the disclosure of which is expressly incorporated by reference in its entirety.

FIELD OF THE DISCLOSURE

Aspects of the present disclosure generally relate to language models and more particularly to image generation using language models.

BACKGROUND

Artificial neural networks may comprise interconnected groups of artificial neurons (e.g., neuron models). The artificial neural network may be a computational device or be represented as a method to be performed by a computational device. Convolutional neural networks (CNNs) are a type of feed-forward artificial neural network. Convolutional neural networks may include collections of neurons that each have a receptive field and that collectively tile an input space. Convolutional neural networks, such as deep convolutional neural networks, have numerous applications. These neural network architectures are used in various technologies, such as image recognition, speech recognition, acoustic scene classification, keyword spotting, autonomous driving, and other classification tasks.

Given the many useful applications of neural networks, there is increasing demand for use of neural networks to solve increasingly complex problems in further areas of application. One area of exploration is generative artificial intelligence.

Large language models (LLMs) have made significant advances in the natural language understanding domain and have gained popularity with respect to textual generative tasks as well as tasks that involve modelling information from textual and visual domains. While these models may perform well on tasks that rely on visual-textual relationship (e.g., captioning or dialogue) training LLMs to understand spatio-temporal relationships and causal structures for visual data is challenging.

SUMMARY

The present disclosure is set forth in the independent claims, respectively. Some aspects of the disclosure are described in the dependent claims.

In some aspects of the present disclosure, a processor-implemented method performed by at least one processor includes receiving an input including one or more of an image or a text prompt. The processor-implemented method also includes processing, by an artificial neural network (ANN), the input to determine one or more virtual brush strokes to generate an output image or one or more commands for controlling an image drawing application to generate the output image. The processor-implemented method further includes generating a list of the one or more virtual brush strokes to generate the output image or the one or more commands for controlling the image drawing application to generate the output image.

Various aspects of the present disclosure are directed to an apparatus including means for receiving an input including one or more of an image or a text prompt. The apparatus further includes means for processing, by the ANN, the input to determine one or more virtual brush strokes to generate an output image or one or more commands for controlling an image drawing application to generate the output image. The apparatus also includes means for generating a list of the one or more virtual brush strokes to generate the output image or the one or more commands for controlling the image drawing application to generate the output image.

In some aspects of the present disclosure, a non-transitory computer-readable medium with non-transitory program code recorded thereon is disclosed. The program code is executed by a processor and includes program code to receive an input including one or more of an image or a text prompt. The program code also includes program code to process, by the ANN, the input to determine one or more virtual brush strokes to generate an output image or one or more commands for controlling an image drawing application to generate the output image. The program code further includes program code to generate a list of the one or more virtual brush strokes to generate the output image or the one or more commands for controlling the image drawing application to generate the output image.

Various aspects of the present disclosure are directed to an apparatus having one or more memories and one or more processors coupled to the memory. The processor(s) is configured to receive an input including one or more of an image or a text prompt. The processor(s) is also configured to process, by the ANN, the input to determine one or more virtual brush strokes to generate an output image or one or more commands for controlling an image drawing application to generate the output image. Furthermore, the processor(s) is configured to generate a list of the one or more virtual brush strokes to generate an output image or the one or more commands for controlling the image drawing application to generate the output image.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 7B is a diagram illustrating a table of example text descriptions for image generation tasks, in accordance with various aspects of the present disclosure.

DETAILED DESCRIPTION

Figure 1:
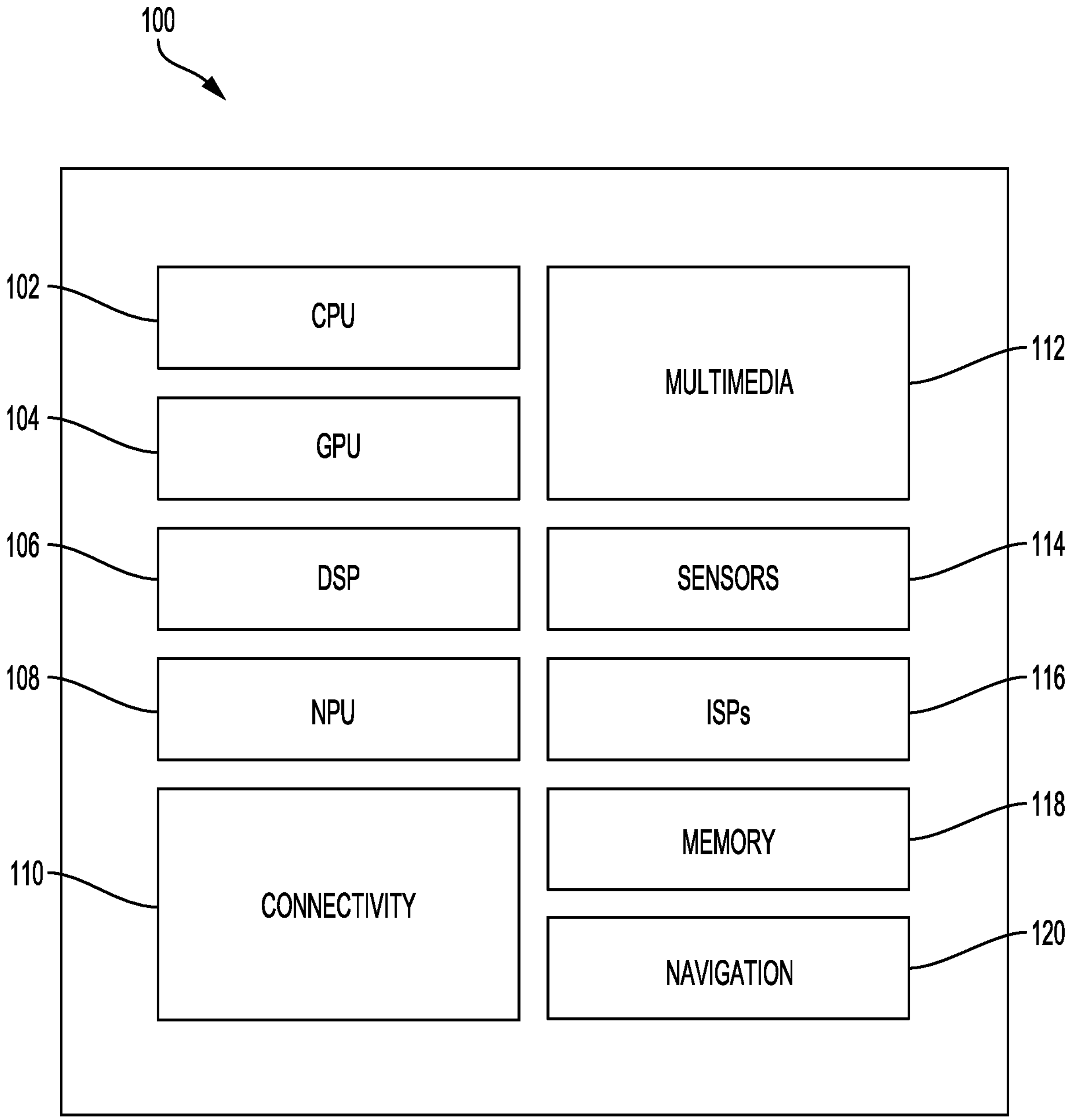
FIG. 1 illustrates an example implementation of a neural network using a system-on-a-chip (SOC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks, and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Large language models (LLMs) are models that use statistical models to analyze data to learn patterns and connections between words and phrases. LLMs have shown impressive results on various reasoning tasks such as on grade school math problems and even on the Law School Admission Tests (LSAT). Language models for these problems, however, deal with only textual data. Many real-world scenarios, however, use reasoning over complex domains that involve heterogeneous sensory inputs (e.g., perceptual cues and language).

Recently, multimodal LLMs have been proposed to solve such multimodal tasks. However, these conventional models may only perform well on tasks that involve high-level, abstract visual-textual relationships. Many conventional multimodal LLM models have lower accuracy in tasks that use fine-grained visual inferences and demand a detailed understanding of spatio-temporal relationships between objects in a scene. Thus, image generation using LLMs may be challenging.

Accordingly, to address these and other challenges, aspects of the present disclosure are directed to image generation using LLMs as a language-vision model. An LLM may be adapted by adding cross-attention modules that may measure cross-attention between image features and hidden states of the LLM. In some aspects, the language-vision model may further include a visual feedback loop to monitor the current state of an image generation task.

In accordance with aspects of the present disclosure, the language-vision model may use LLMs to perform image generation tasks by generating virtual brush strokes to paint an image in an auto-regressive manner. An LLM may be trained to draw sketches by generating virtual brush strokes or by controlling an image drawing application.

Particular aspects of the subject matter described in this disclosure can be implemented to realize one or more of the following potential advantages. In some examples, the described techniques may beneficially be applied to image reproduction, partial image completion, and other image generation tasks, for instance.

FIG. 1 illustrates an example implementation of a system-on-a-chip (SOC) 100, which may include a central processing unit (CPU) 102 or a multi-core CPU configured for image generation using a language model. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may include code to receive an input including one or more of an image or a text prompt. The general-purpose processor 102 may also include code to process, by an artificial neural network (ANN), the input to determine one or more virtual brush strokes to generate an output image or one or more commands for controlling an image drawing application to generate the output image. The general-purpose processor 102 may also include code to generate a list of the one or more virtual brush strokes to generate the output image or the one or more commands for controlling the image drawing application to generate the output image.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
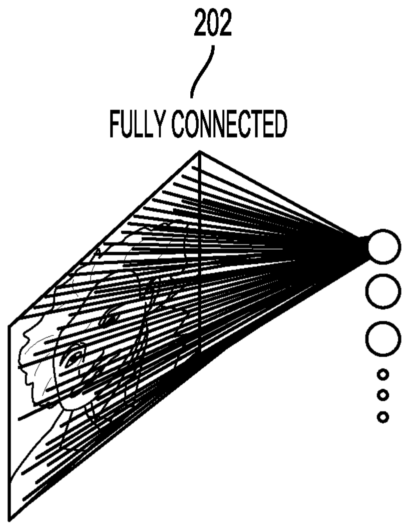
FIGS. 2A, 2B, and 2C are diagrams illustrating a neural network, in accordance with various aspects of the present disclosure.
Figure 2B:
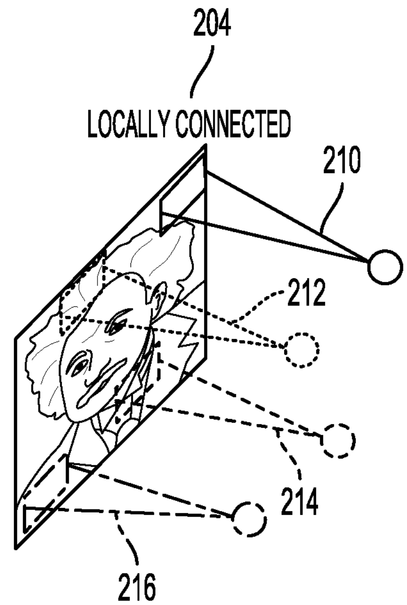

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer because the higher layer neurons in a given region may receive inputs that are tuned through training to the properties of a restricted portion of the total input to the network.

Figure 2C:
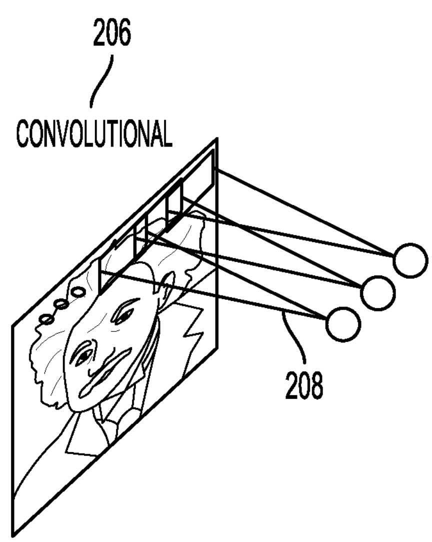

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
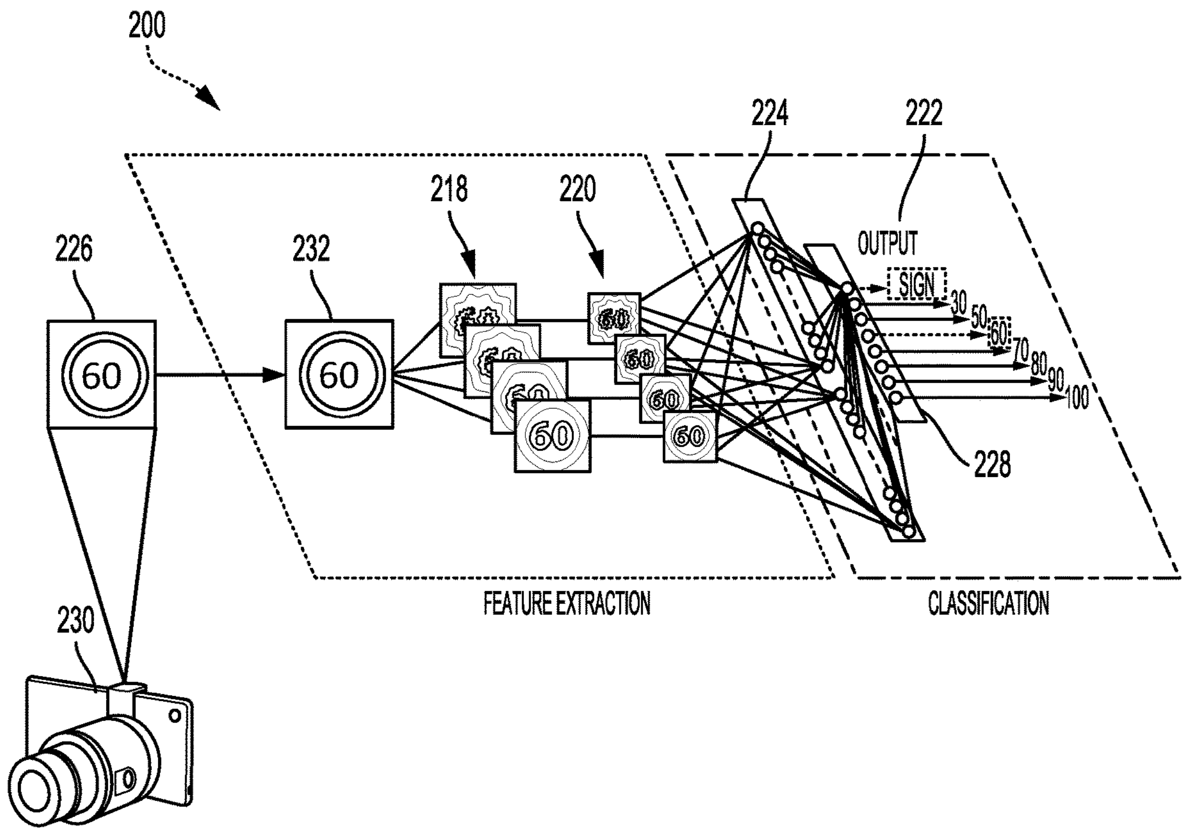
FIG. 2D is a diagram illustrating an exemplary deep convolutional network (DCN), in accordance with various aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 may be a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 may likely be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN 200 may be presented with new images and a forward pass through the DCN 200 may yield an output 222 that may be considered an inference or a prediction of the DCN 200.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max (0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

Figure 3:
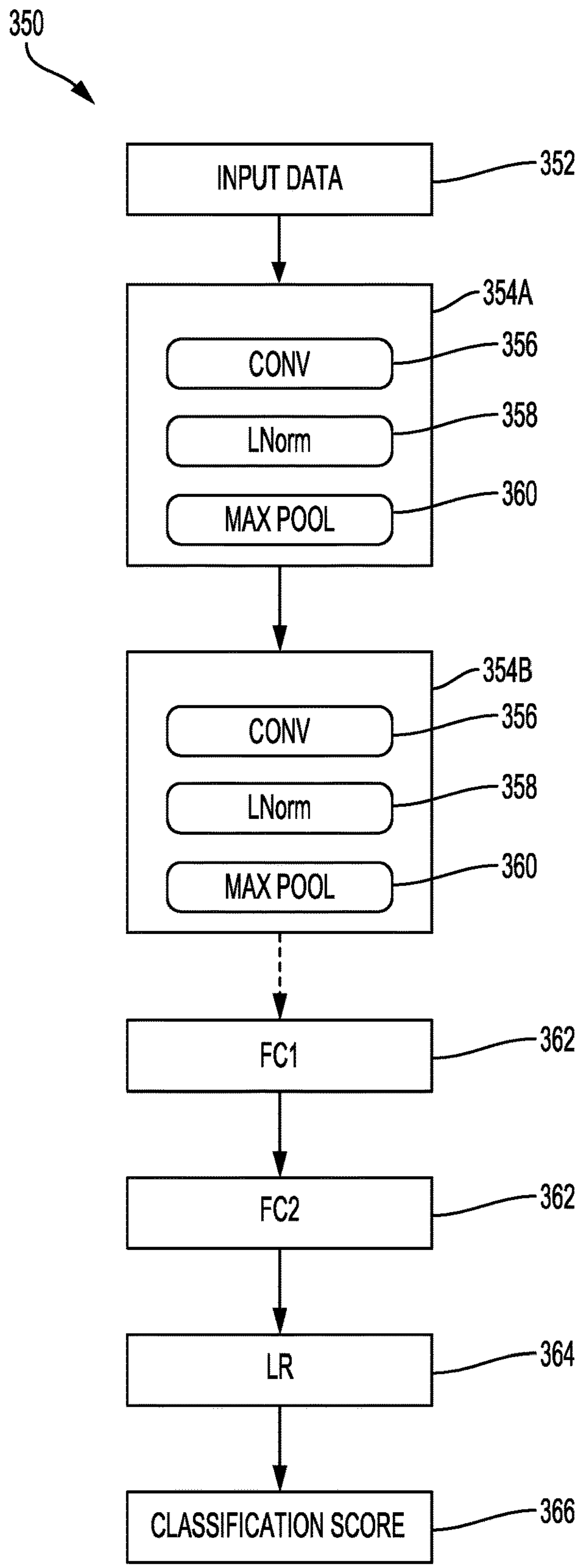
FIG. 3 is a block diagram illustrating an exemplary deep convolutional network (DCN), in accordance with various aspects of the present disclosure.

FIG. 3 is a block diagram illustrating a DCN 350. The DCN 350 may include multiple different types of layers based on connectivity and weight sharing. As shown in FIG. 3, the DCN 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

Although only two of the convolution blocks 354A, 354B are shown, the present disclosure is not so limiting, and instead, any number of the convolution blocks 354A, 354B may be included in the DCN 350 according to design preference.

The convolution layers 356 may include one or more convolutional filters, which may be applied to the input data to generate a feature map. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a DCN may be loaded on a CPU 102 or GPU 104 of an SOC 100 (e.g., FIG. 1) to achieve high performance and low power consumption. In alternative embodiments, the parallel filter banks may be loaded on the DSP 106 or an ISP 116 of an SOC 100. In addition, the DCN 350 may access other processing blocks that may be present on the SOC 100, such as sensor processor 114 and navigation module 120, dedicated, respectively, to sensors and navigation.

The DCN 350 may also include one or more fully connected layers 362 (FC1 and FC2). The DCN 350 may further include a logistic regression (LR) layer 364. Between each layer 356, 358, 360, 362, 364 of the DCN 350 are weights (not shown) that are to be updated. The output of each of the layers (e.g., 356, 358, 360, 362, 364) may serve as an input of a succeeding one of the layers (e.g., 356, 358, 360, 362, 364) in the DCN 350 to learn hierarchical feature representations from input data 352 (e.g., images, audio, video, sensor data and/or other input data) supplied at the first of the convolution blocks 354A. The output of the DCN 350 is a classification score 366 for the input data 352. The classification score 366 may be a set of probabilities, where each probability is the probability of the input data including a feature from a set of features.

Figure 4:
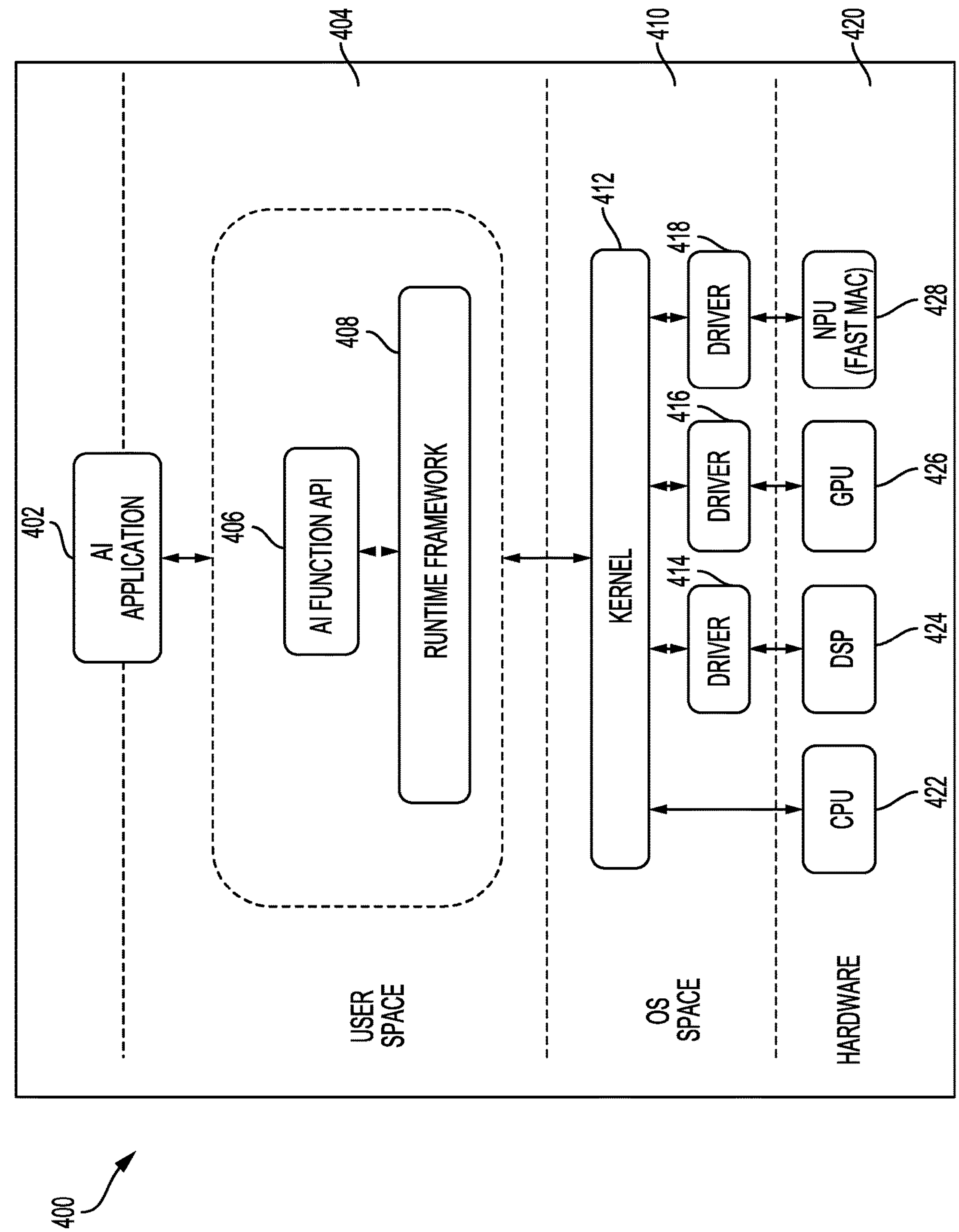
FIG. 4 is a block diagram illustrating an exemplary software architecture that may modularize artificial intelligence (AI) functions, in accordance with various aspects of the present disclosure.

FIG. 4 is a block diagram illustrating an exemplary software architecture 400 that may modularize artificial intelligence (AI) functions. Using the architecture 400, applications may be designed that may cause various processing blocks of an SOC 420 (for example a CPU 422, a DSP 424, a GPU 426 and/or an NPU 428) to support image generation using a language model for an AI application 402, according to aspects of the present disclosure. The architecture 400 may, for example, be included in a computational device, such as a smartphone.

The AI application 402 may be configured to call functions defined in a user space 404 that may, for example, provide for the detection and recognition of a scene indicative of the location at which the computational device including the architecture 400 currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine 408, for example, to request an inference at a particular time interval or triggered by an event detected by the user interface of the AI application 402. When caused to provide an inference response, the run-time engine 408 may in turn send a signal to an operating system in an operating system (OS) space 410, such as a Kernel 412, running on the SOC 420. In some examples, the Kernel 412 may be a LINUX Kernel. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

As described, aspects of the present disclosure are directed to image generation using language models. In accordance with aspects of the present disclosure, LLMs may be reconfigured as a language-vision model. The language-vision model may perform image generation tasks by generating virtual brush strokes to paint an image. In some aspects, the language-vision model may determine the virtual brush strokes to paint an image and an image drawing software tool may be employed to generate the image.

Unlike conventional text-to-image conversion methods, the language-vision model may draw sketches by generating a sequence of virtual brush strokes or operating commands in an auto-regressive manner. In addition, the language-vision model may include a feedback loop to monitor a current state of image generation tasks. As such, the feedback loop may serve as a virtual eye on the canvas to observe as the virtual brush strokes are drawn.

Figure 5:
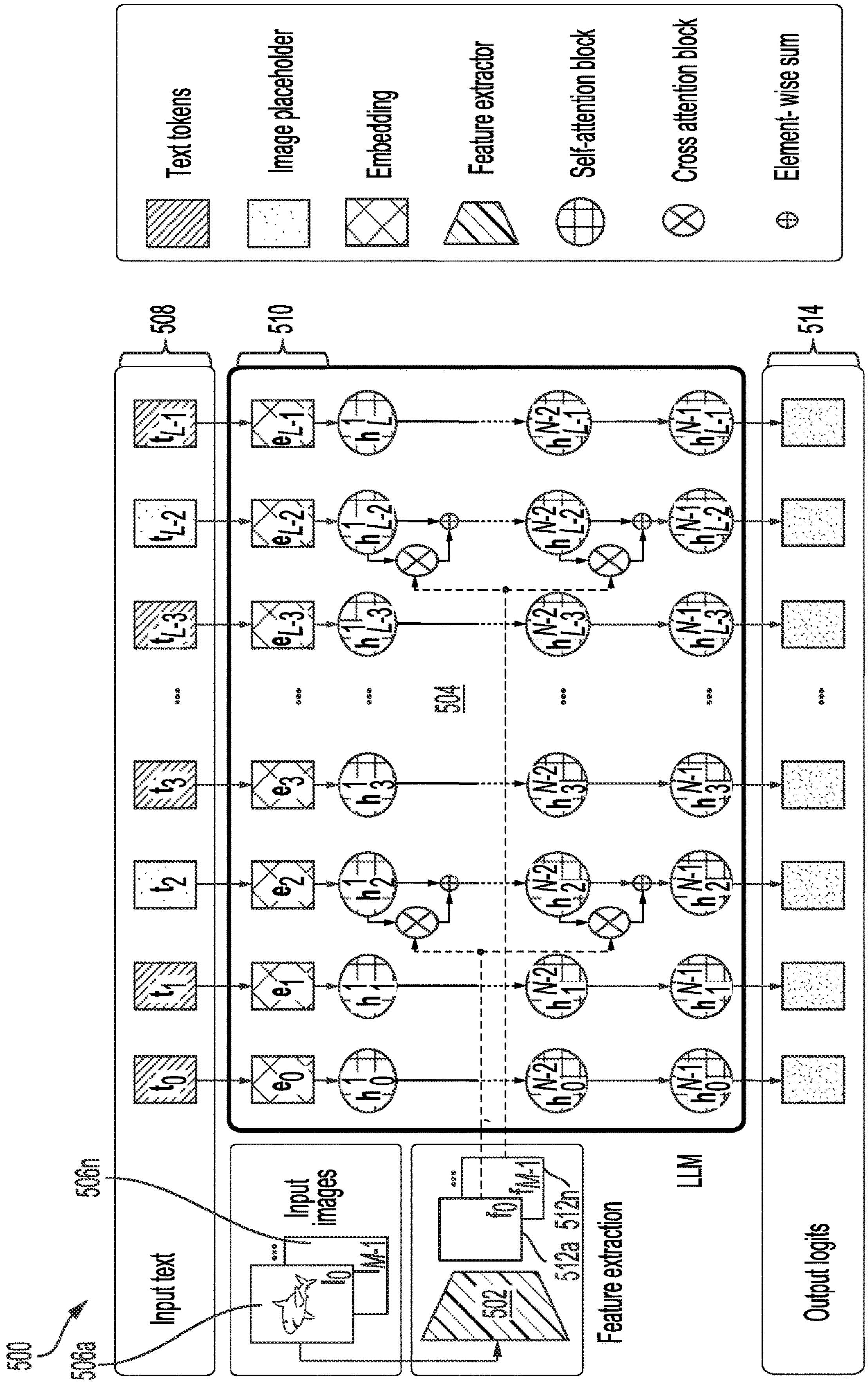
FIG. 5 is a block diagram illustrating an example architecture for image generation using a language model, in accordance with various aspects of the present disclosure.

FIG. 5 is a block diagram illustrating an example architecture 500 for image generation using a language model, in accordance with various aspects of the present disclosure. Referring to FIG. 5, the example architecture 500 may include a feature extractor 502 and a language model 504. The feature extractor 502 may be a convolutional neural network (CNN), for example. The language model 504 may be an LLM, for example. The example architecture 500 may receive as an input, an interleaved sequence of images (e.g., 506*a-n*) $\mathbb{I}=\{I_0, \ldots, I_{M-1}\}$ and text data 508 $\mathbb{T}=\{t_0, t_1, \ldots, t_{L-1}\}$, where M and L represent the length of the image sequence (e.g., 506*a-n*) and the text data sequence (e.g., 508), respectively. The input images $I_i$ 506*a-n* may be received by the feature extractor 502. The feature extractor 502 may extract grid level image features $f_i$ 512*a-n* (e.g., $f_0, \ldots, f_{M-1}$) of the images $I_i$ 506*a-n*, where $f_i \in \mathbb{R}^{M\times F}$ and F represents image feature dimensionality. That is, the image features $f_i$ 512*a-n* may include spatio-temporal information of the images $I_i$ 506*a-n*.

The text data $t_i$ 508 may be separated from the images $I_i$ 506*a-n* of the interleaved input and include a placeholder (e.g., $t_2$ and $t_{L-2}$) for each corresponding image features 512*a-n* to preserve positional information. In some aspects, the text data may be tokenized, as shown in the example of FIG. 5. That is, the text data $t_i$ 508 may be split into subparts (e.g., words, phrases, sentences, or other sequences of characters) that may be referred to as tokens.

The input text data $t_i$ 508 may be pre-processed to text embeddings $e_i$ 510 (e.g., $e_0, e_1, \ldots, e_{L-1}$) and provided to an input layer of the language model 504. The language model 504 may process the text embeddings $e_i$ 510 through self-attention layers of the language model 504 to generate a hidden state $$h_i^l$$

for each token of text and form more dense embeddings, where e and h$\in \mathbb{R}^{L\times H}$, l represents the layer of the language model 504, and H represents the embedding/hidden state dimensionality. Positional embeddings (e.g., $e_2$ and $e_{L-2}$) and corresponding hidden states (e.g., $$h_2^1$$

and $$h_{L-2}^1$$

) may be generated for each of the placeholders (e.g., $t_2$ and $t_{L-2}$).

The image features $f_i$ 512*a-n* may also be received by the language model 504. The image features $f_i$ 512*a-n* may be processed at cross-attention layers (shown as ⊗) guided by positional embeddings (e.g., $e_2$ and $e_{L-2}$) corresponding to the placeholders included in the input text 508. For example, the image features $f_i$ 512*a-n* may be concatenated with the positional embeddings (e.g., $e_2$ and $e_{L-2}$) to preserve the spatial information that may enable a top-down attention approach such that the language model 504 may guide an information extraction process for visual reasoning tasks.

The cross-attention ayers ⊗ may measure cross-attention between image features $f_i$ 512*a-n* and hidden states (e.g., $$h_2^1$$

and $$h_{L-2}^1$$

) for the corresponding positional embeddings (e.g., $e_2$ and $e_{L-2}$). The cross-attention layers ⊗ may extract keys and values from the image features f; 512*a-n* and queries from the hidden states (e.g $$h_2^1$$

and $$h_{L-2}^1$$

) corresponding to the positional embedding (e.g., $e_2$ and $e_{L-2}$) to compute the cross-attention. The measured cross-attention may then be added to the hidden states in an element-wise sum, as given by:

$$h_j^l \mathrel{+}= \text{Cross} - Attn\left(f_i, h_j^l\right), \text{ for } 0 \le l \le L-1, \tag{1}$$

where Cross-Attn is the cross-attention function and j represents the location of the placeholder. The language model 504 may, in turn, generate an output logit 514 associated with the text data $t_i$ 508 (e.g., tokens).

In some aspects, the language model 504 may be trained to determine the set of virtual brush strokes using a training data set. The training data set may include pairs of textual data and drawings. Each of the drawings may be included in a stroke format. The drawings may include one or more objects. When the drawing includes multiple objects, the textual data may include a relationship of the multiple objects, for example.

In an example, given an input including one or more of an image (e.g., 506*a-n*) or textual data (e.g., 508), the example architecture 500 may process the input to determine a set of virtual brush stokes to generate the input image (e.g., 506*a-n*), for example. The output logit 514 having the greatest percentage may indicate a next virtual brush stroke (or a sequence of brush strokes), for example.

In some aspects, the example architecture 500 may determine a set of commands corresponding to the brush strokes for controlling an image drawing application to generate the sketch of the input image. The commands may be in a hypertext markup language (HTML) format (e.g., <command> . . . </command>) or other programming language format suitable for the image drawing application. For instance, in one non-limiting example, the example architecture 500 may determine and specify a stroke of sketch of the input image (e.g., 506*a-n*) in the format <stroke> color R G B width W points $x_1$, $y_1$, . . . , $x_n$, $y_n$, </stroke> <image=?>.

Figure 6:
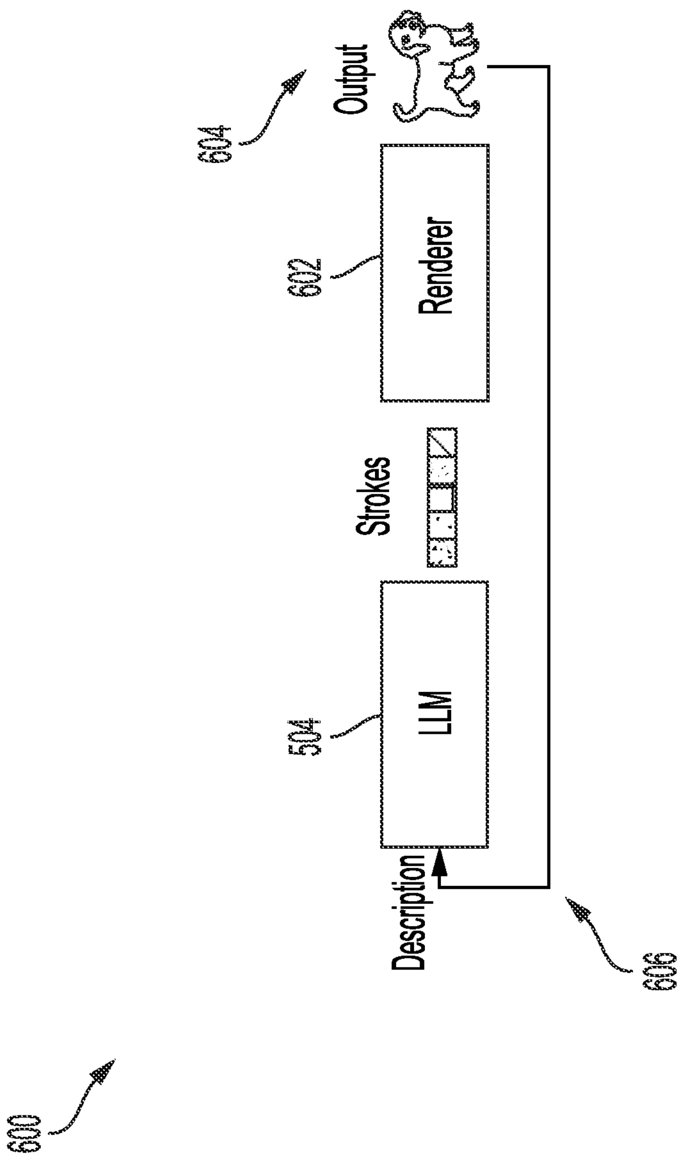
FIG. 6 is a block diagram illustrating an example architecture for image generation using a language model, in accordance with various aspects of the present disclosure.

FIG. 6 is a block diagram illustrating an example architecture 600 for image generation using a language model, in accordance with various aspects of the present disclosure. Referring to FIG. 6, the example architecture 600 may include the language model 504 (e.g., LLM) of FIG. 5 and a renderer 602. The example architecture 600 may be configured to generate an output image 604 using virtual brush strokes, for example. In this example, the language model 504 may receive a description of an image to be generated as an input. For example, the description may include text data (e.g., a token) such as "sketch a dog." In turn, the language model 504 may determine one or more virtual brush strokes or commands for controlling the renderer 602 to generate an image. The one or more virtual brush strokes may be supplied to the renderer 602, which may perform the strokes.

The renderer 602 may execute a first virtual brush stroke rendering of an image of the brush stroke on a display, which may serve as a virtual canvas. A feedback loop 606 may provide a canvas state to the language model 504, which may determine a next virtual brush stroke and/or command for generating the output image 604. In some aspects, the canvas state may comprise an image of the output rendering after executing the virtual brush stroke or command for generating the output image 604. In some aspects, the entire set of one of more virtual strokes may be drawn all at once to generate the output image 604.

Figure 7A:
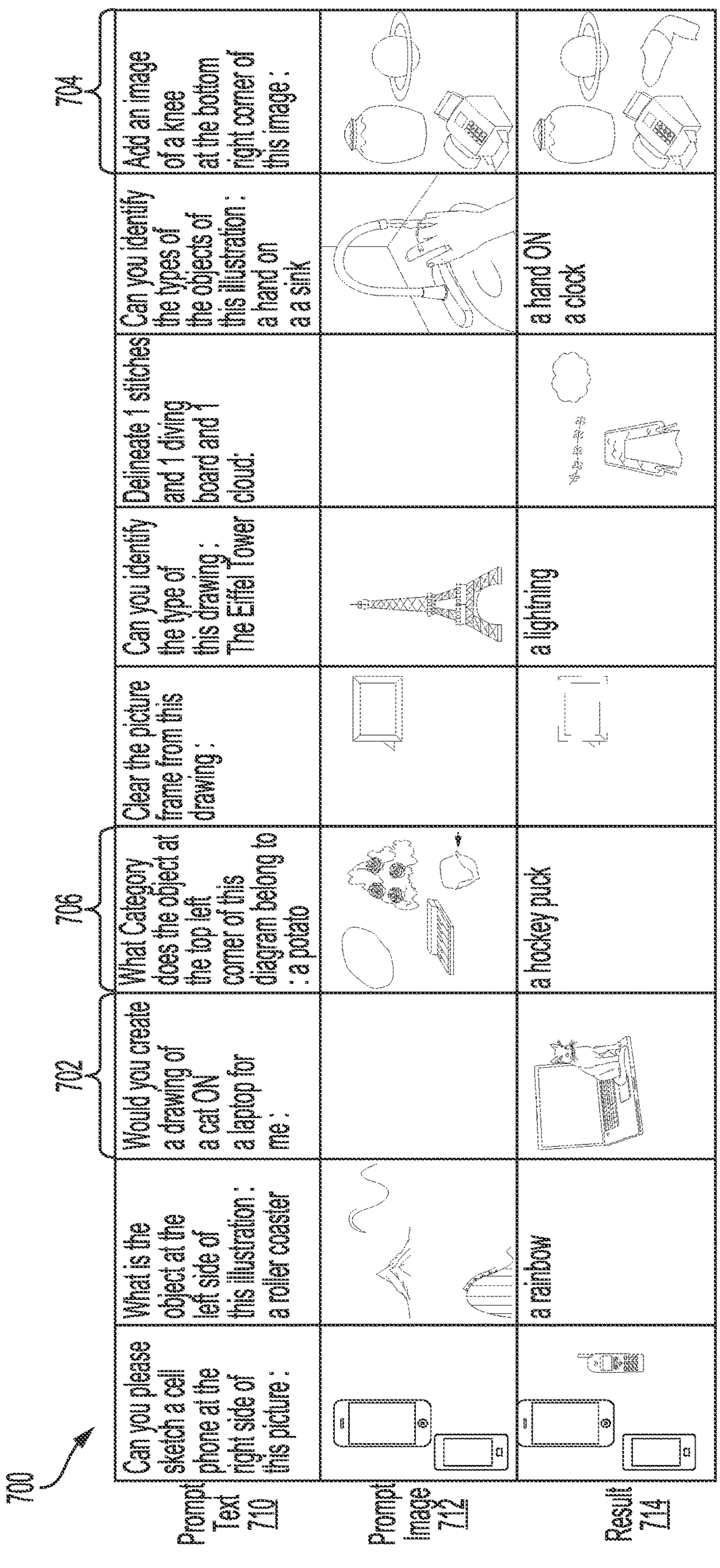
FIG. 7A is a diagram illustrating examples of input prompts and results that may be generated by a language model, in accordance with various aspects of the present disclosure.

FIG. 7A is a diagram illustrating examples 700 of input prompts and results that may be generated by a language model, in accordance with various aspects of the present disclosure. As shown in FIG. 7A, the language model (e.g., 504 of FIG. 5) may receive an input including text prompt (e.g., 710), a prompt image (e.g., 712), or both. In turn, the language model (e.g., 504) may perform a visual reasoning task corresponding to the text prompt (e.g., 710) to generate a result (e.g., 714). For example, at 702, given a text prompt (e.g., 710) "Would you create a drawing of a cat on a laptop for me." the language model (e.g., 504) may determine virtual brush strokes to generate the requested image. The language model (e.g., 504) may process the text prompt (e.g., 710) to determine one or more objects (e.g., cat and/or laptop) to be drawn and a relationship between the objects (e.g., cat "on" a laptop). In turn, a rendering of the virtual brush strokes may be generated to produce an image including the head of the cat on a laptop, for example.

In another example, at 704, the language model (e.g., 504) may receive an input including a text prompt (e.g., 710) and a prompt image (e.g., 712). The text prompt (e.g., 710) may indicate that an object (e.g., a knee) is to be added to the prompt image (e.g., 712). Additionally, the text prompt (e.g., 710) may indicate a location in the prompt image (e.g., 712) at which the additional object is to be drawn. The language model (e.g., 504) may process the input text prompt (e.g., 710) and prompt image (e.g., 712) to determine a first set of virtual strokes to generate a sketch of the input image. In addition, the language model (e.g., 504) may determine an identity of the added object to be drawn, a second set of virtual strokes to generate a sketch of the added object, as well as a location for executing the virtual strokes, for instance.

In another example, at 706, the language model (e.g., 504) may receive an input including a text prompt (e.g., 710) and a prompt image (e.g., 712) including multiple objects. The text prompt (e.g., 710) may request an indication of a category to which an object at a specified location (e.g., top left corner of the image) belongs. The language model (e.g., 504) may process the text prompt (e.g., 710) and the prompt image (e.g., 712) to determine the identity (e.g., a hockey puck) of the object at the specified location.

FIG. 7B is a diagram illustrating a table 750 of example text descriptions for image generation tasks, in accordance with various aspects of the present disclosure. As shown in FIG. 7B, a set of default text prompts 756 for various tasks 752 may be defined. The default text prompts 756 may be defined for different scenarios 754 including, but not limited to, the number of objects, whether a specific location is defined, a relationship between the objects, or other scenarios, for instance. In order to diversify text prompts (e.g., 756), the default text prompts may be extended by rephrasing each of the default text prompts 756 in several different ways using a pre-trained LLM for generating pre-processed text.

In various aspects of the present disclosure, a dataset of text-image pairs may be defined for training the language-vision model. The dataset may, for instance, include (but is not limited to) images expressed in the form of brush strokes. For example, the text-image pairs may include text description-sketch pairs, in which all brush movements involved in generating the sketch may be recorded.

The dataset may include images (e.g., sketches) having one or more objects, and defines a composition or a relationship between the objects. The relationship may include a relative location tag for the objects, for example. The dataset may also assign a text prompt to each sample from a list of tasks.

The text description may include task-dependent text descriptions for the sketches. The text descriptions may associate a randomly selected task to a sketch from a set of predefined tasks. A text prompt may then be defined based on the selected task. In some aspects, the text prompt may also be defined based on the number of objects and the associations between such objects in the sketch.

A prompt may be randomly selected and may be assigned to a sketch. After a task-dependent prompt is assigned to a sketch, a prompt sketch and a ground-truth sketch may be generated. The prompt sketch and ground-truth sketch may include one or more modifications in comparison to an original sketch based on the selected task. The prompt sketch may be provided to the language-vision model (e.g., 500 of FIG. 5) as a part of the prompt and the ground truth sketch may be used for supervised training of the language-vision model. Task-dependent modifications may vary widely, for example, in the generate-all task, all the objects may be removed from the sketch to generate the prompt sketch and a blank canvas may be provided to the language-vision model (e.g., 500 of FIG. 5) to begin with. On the other hand, the ground-truth sketch may not include any modifications.

The language-vision model (e.g., 500) may be trained based on auxiliary tasks to improve performance on primary tasks and enable the language-vision model (e.g., 500) to perform complementary tasks (e.g., wiping or deleting an object from a sketch) and to provide an explainable model framework.

By training the language-vision model (e.g., 500) on the defined dataset, the language-vision model may draw sketches, complete incomplete sketches, wipe or remove objects from a virtual canvas, and generate a reproduction of an image using a determined set of virtual brush strokes. Additionally, the language-vision model (e.g., 500) may detect and classify objects received as inputs, as well as objects in the virtual canvas.

Figure 8:
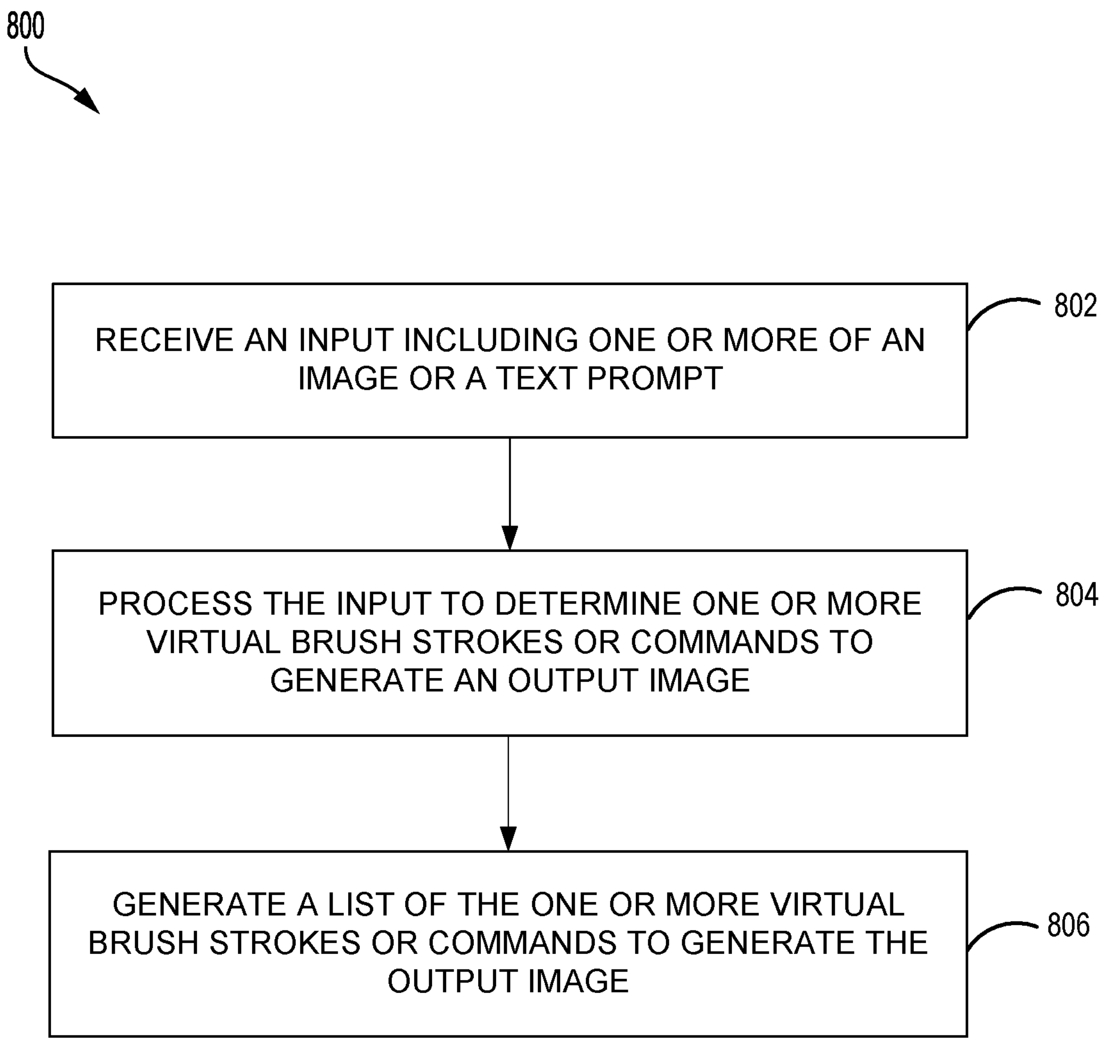
FIG. 8 is a flow diagram illustrating a processor-implemented method for generating an image using a language model, in accordance with various aspects of the present disclosure.

FIG. 8 is a flow diagram illustrating a processor-implemented method 800 for generating an image using a language model, in accordance with various aspects of the present disclosure. The processor-implemented method 800 may be performed by one or more processors, such as the CPU (e.g., 102, 422), GPU (e.g., 104, 426), DSP (e.g., 106, 424), and/or NPU (e.g., 108, 428), for example.

At block 802, the processor receives an input including one or more of an image or a text prompt. For instance, as described with reference to FIG. 5, the example architecture 500 may receive as an input, an interleaved sequence of images (e.g., 506*a*-*n*) and text data 508.

At block 804, the processor processes, by an artificial neural network (ANN), the input to determine one or more virtual brush strokes to generate an output image or one or more commands for controlling an image drawing application to generate the output image. For example, as described with reference to FIG. 5, the language model 504 may be trained to determine the set of virtual brush strokes using a training data set. The training data set may include pairs of textual data and drawings. Each of the drawings may be included in a stroke format. As such, given an input including one or more of an image (e.g., 506*a*-*n*) or textual data (e.g., 508), the example architecture 500 may be process the input to determine a set of virtual brush stokes to generate the input image. In some aspects, the example architecture 500 may determine a set of commands corresponding to the brush strokes for controlling an image drawing application to generate the sketch of the input image. The commands may be in a hypertext markup language (HTML) format (e.g., <command> . . . </command>) or other programming language format suitable for the image drawing application.

Furthermore, at block 806, the processor generates a list of the one or more virtual brush strokes to generate the output image or the one or more commands for controlling the image drawing application to generate the output image.

Implementation examples are provided in the following numbered clauses.

1. A processor-implemented method performed by at least one processor, the processor-implemented method comprising:
   receiving an input including one or more of an image or a text prompt;
   processing, by an artificial neural network (ANN), the input to determine one or more virtual brush strokes to generate an output image or one or more commands for controlling an image drawing application to generate the output image; and
   generating a list of the one or more virtual brush strokes to generate the output image or the one or more commands for controlling the image drawing application to generate the output image.
2. The processor-implemented method of clause 1, further comprising executing the one or more virtual brush strokes to produce a rendering of the output image.

3. The processor-implemented method of clause 1 or 2, in which the input includes only the text prompt.
4. The processor-implemented method of any of clauses 1-3, in which the input includes the image and the text prompt and the ANN performs a visual reasoning task to determine the output image.
5. The processor-implemented method of any of clauses 1-4, in which the image comprises a partial object and the ANN generates a list of virtual brush strokes to produce a remainder of the partial object.
6. The processor-implemented method of any of clauses 1-5, in which the ANN determines a classification based on the output image.
7. The processor-implemented method of any of clauses 1-6, in which the image comprises multiple objects, and the ANN determines the list of the one or more virtual brush strokes to generate the output image, the output image including a subset of the multiple objects.
8. The processor-implemented method of any of clauses 1-7, in which the ANN comprises a language model.
9. An apparatus, comprising:
   at least one memory; and
   at least one processor coupled to the at least one memory, the at least one processor configured to:
      receive an input including one or more of an image or a text prompt;
      process, by an artificial neural network (ANN), the input to determine one or more virtual brush strokes to generate an output image or one or more commands for controlling an image drawing application to generate the output image; and
      generate a list of the one or more virtual brush strokes to generate the output image or the one or more commands for controlling the image drawing application to generate the output image.
10. The apparatus of clause 9, in which the at least one processor is further configured to execute the one or more virtual brush strokes to produce a rendering of the output image.
11. The apparatus of clause 9 or 10, in which the input includes only the text prompt.
12. The apparatus of any of clauses 9-11, in which the input includes the image and the text prompt and the ANN performs a visual reasoning task to determine the output image.
13. The apparatus of clauses 9-12, in which the image comprises a partial object and the ANN generates a list of virtual brush strokes to produce a remainder of the partial object.
14. The apparatus of clauses 9-13 in which the at least one processor is further configured to determine, by the ANN, a classification based on the output image.
15. The apparatus of clauses 9-14, in which the image comprises multiple objects, and the at least one processor is further configured to determine, by the ANN, the list of the one or more virtual brush strokes to generate the output image, the output image including a subset of the multiple objects.
16. The apparatus of clauses 9-15, in which the ANN comprises a language model.
17. A non-transitory computer-readable medium having program code recorded thereon, the program code executed by a processor and comprising:
   program code to receive an input including one or more of an image or a text prompt;
   program code to process, by an artificial neural network (ANN), the input to determine one or more virtual brush strokes to generate an output image or one or more commands for controlling an image drawing application to generate the output image; and
   program code to generate a list of the one or more virtual brush strokes to generate the output image or the one or more commands for controlling the image drawing application to generate the output image.
18. The non-transitory computer-readable medium of clause 17, in which the program code comprises program code to execute the one or more virtual brush strokes to produce a rendering of the output image.
19. The non-transitory computer-readable medium of clause 17 or 18, in which the input includes only the text prompt.
20. The non-transitory computer-readable medium of any of clauses 17-19, in which the input includes the image and the text prompt and the program code further comprises program code to perform, by the ANN, a visual reasoning task to determine the output image.
21. The non-transitory computer-readable medium of any of clauses 17-20, in which the image comprises a partial object and the program code further comprises program code to generate, by the ANN, a list of virtual brush strokes to produce a remainder of the partial object.
22. The non-transitory computer-readable medium of any of clauses 17-21, in which the program code comprises program code to determine, by the ANN, a classification based on the output image.
23. The non-transitory computer-readable medium of any of clauses 17-22, in which the image comprises multiple objects, and the program code further comprises program code to determine, by the ANN, the list of the one or more virtual brush strokes to generate the output image, the output image including a subset of the multiple objects.
24. The non-transitory computer-readable medium of any of clauses 17-24, in which the ANN comprises a language model.
25. An apparatus, comprising:
   means for receiving an input including one or more of an image or a text prompt;
   means for processing, by an artificial neural network (ANN), the input to determine one or more virtual brush strokes to generate an output image or one or more commands for controlling an image drawing application to generate the output image; and
   means for generating a list of the one or more virtual brush strokes to generate the output image or the one or more commands for controlling the image drawing application to generate the output image.
26. The apparatus of clause 25, further comprising means for executing the one or more virtual brush strokes to produce a rendering of the output image.
27. The apparatus of clause 25 or 26, in which the input includes only the text prompt.
28. The apparatus of any of clauses 25-27, in which the input includes the image and the text prompt and the apparatus further comprises means for performing, by the ANN, a visual reasoning task to determine the output image.
29. The apparatus of any of clauses 25-28, in which the image comprises a partial object and the apparatus further comprises means for generating, by the ANN, a list of virtual brush strokes to produce a remainder of the partial object.

30. The apparatus of any of clauses 25-29, in which the image comprises multiple objects, and the apparatus further comprises means for determining, by the ANN, the list of the one or more virtual brush strokes to generate the output image, the output image including a subset of the multiple objects.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method performed by at least one processor, the processor-implemented method comprising:

receiving a first input including one or more of a first image or a text prompt;

processing, by an artificial neural network (ANN), the first input to determine a sequence of virtual brush strokes to draw an output image and one or more commands corresponding to the sequence of virtual brush strokes for controlling an image drawing application to draw the output image, each virtual brush stroke comprising a brush stroke of a sketch provided in a stroke format or painting provided in the stroke format;

generating a list of the sequence of virtual brush strokes to draw the output image and the one or more commands corresponding to the sequence of virtual brush strokes for controlling the image drawing application to draw the output image, the one or more commands having color, coordinate and width parameters; and executing the sequence of virtual brush strokes to render a second image of each of the sequence of virtual brush strokes on a stroke-by-stroke basis, wherein the executing comprises, for each virtual brush stroke in the sequence of virtual brush strokes:

rendering a virtual brush stroke on a virtual canvas to produce an updated canvas state; and providing the updated canvas state as a second input to the ANN to determine a next virtual brush stroke in the sequence of virtual brush strokes.

2. The processor-implemented method of claim 1, in which the first input includes only the text prompt.

3. The processor-implemented method of claim 1, in which the first input includes the first image and the text prompt and the ANN performs a visual reasoning task to determine the output image.

4. The processor-implemented method of claim 3, in which the first image comprises a partial drawing of an object and the ANN generates the list of the sequence of virtual brush strokes to produce a complete drawing of the object.

5. The processor-implemented method of claim 3, in which the ANN determines a classification based on the output image.

6. The processor-implemented method of claim 1, in which the first image comprises multiple objects, and the ANN determines the list of the sequence of virtual brush strokes to draw the output image, the output image including a subset of the multiple objects.

7. The processor-implemented method of claim 1, in which the ANN comprises a language model.

8. An apparatus, comprising:

at least one memory; and at least one processor coupled to the at least one memory, the at least one processor configured to:

receive a first input including one or more of a first image or a text prompt;

process, by an artificial neural network (ANN), the first input to determine a sequence of virtual brush strokes to draw an output image and one or more commands corresponding to the sequence of virtual brush strokes for controlling an image drawing application to draw the output image, each virtual brush stroke comprising a brush stroke of a sketch provided in a stroke format or painting provided in the stroke format;

generate a list of the sequence of virtual brush strokes to draw the output image and the one or more commands corresponding to the sequence of virtual brush strokes for controlling the image drawing application to draw the output image, the one or more commands having color, coordinate and width parameters; and execute the sequence of virtual brush strokes to render a second image of each of the sequence of virtual brush strokes on a stroke-by-stroke basis, wherein, for each virtual brush stroke in the sequence of virtual brush strokes, the at least one processor is further configured to:

render a virtual brush stroke on a virtual canvas to produce an updated canvas state, and provide the updated canvas state as a second input to the ANN to determine a next virtual brush stroke in the sequence of virtual brush strokes.

9. The apparatus of claim 8, in which the first input includes only the text prompt.

10. The apparatus of claim 8, in which the first input includes the first image and the text prompt and the ANN performs a visual reasoning task to determine the output image.

11. The apparatus of claim 10, in which the first image comprises a partial drawing of an object and the ANN generates the list of the sequence of virtual brush strokes to produce a complete drawing of the object.

12. The apparatus of claim 8, in which the at least one processor is further configured to determine, by the ANN, a classification based on the output image.

13. The apparatus of claim 8, in which the first image comprises multiple objects, and the at least one processor is further configured to determine, by the ANN, the list of the sequence of virtual brush strokes to draw the output image, the output image including a subset of the multiple objects.

14. The apparatus of claim 8, in which the ANN comprises a language model.

15. A non-transitory computer-readable medium storing instructions that when executed by a processor cause the processor to:

receive a first input including one or more of a first image or a text prompt;

process, by an artificial neural network (ANN), the first input to determine a sequence of virtual brush strokes to draw an output image and one or more commands corresponding to the sequence of virtual brush strokes for controlling an image drawing application to draw the output image, each virtual brush stroke comprising a brush stroke of a sketch provided in a stroke format or painting provided in the stroke format;

generate a list of the sequence of virtual brush strokes to draw the output image and the one or more commands corresponding to the sequence of virtual brush strokes for controlling the image drawing application to draw the output image, the one or more commands having color, coordinate and width parameters; and execute the sequence of virtual brush strokes to render a second image of each of the sequence of virtual brush strokes on a stroke-by-stroke basis, wherein, for each virtual brush stroke in the sequence of virtual brush strokes, the processor is further caused to:

render a virtual brush stroke on a virtual canvas to produce an updated canvas state; and provide the updated canvas state as a second input to the ANN to determine a next virtual brush stroke in the sequence of virtual brush strokes.

16. The non-transitory computer-readable medium of claim 15, in which the first input includes only the text prompt.

17. The non-transitory computer-readable medium of claim 15, in which the first input includes the first image and the text prompt and the instructions further cause the processor to perform, by the ANN, a visual reasoning task to determine the output image.

18. The non-transitory computer-readable medium of claim 17, in which the first image comprises a partial drawing of an object and the ANN generates the list of the sequence of virtual brush strokes to produce a complete drawing of the object.

19. The non-transitory computer-readable medium of claim 15, in which the instructions further cause the processor to determine, by the ANN, a classification based on the output image.

20. The non-transitory computer-readable medium of claim 15, in which the first image comprises multiple objects, and the instructions further cause the processor to determine, by the ANN, the list of the sequence of virtual brush strokes to draw the output image, the output image including a subset of the multiple objects.

21. The non-transitory computer-readable medium of claim 15, in which the ANN comprises a language model.

* * * * *